Sept. 22, 1942.    K. R. HERMAN ET AL    2,296,669
POWER TRANSMISSION
Filed Feb. 23, 1940
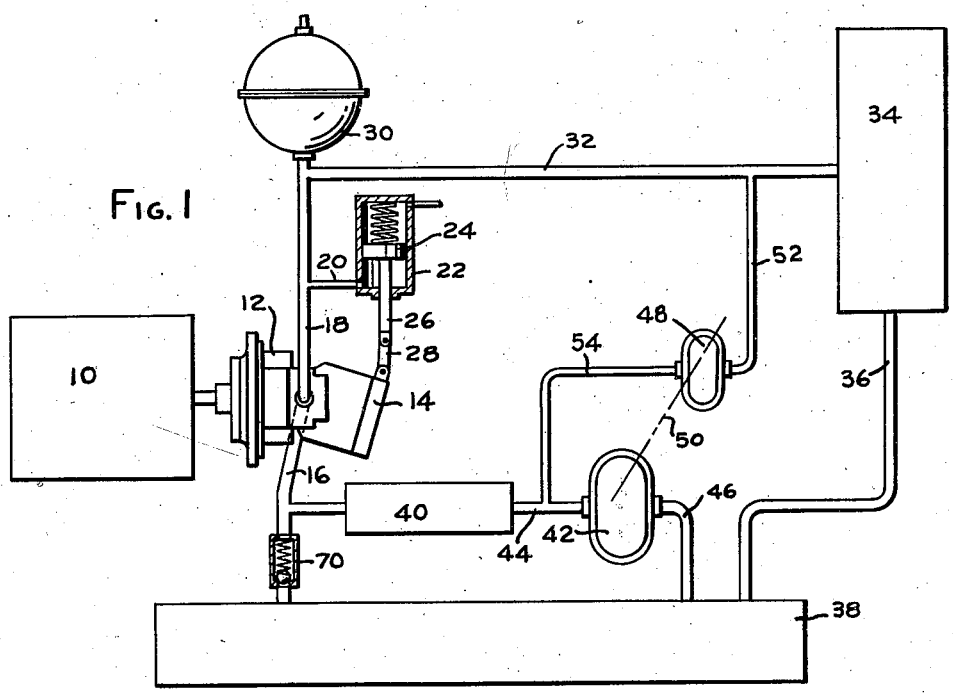
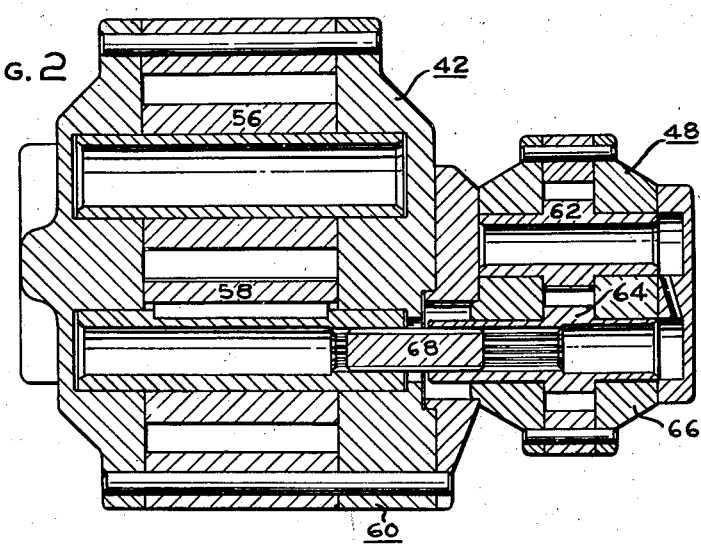
INVENTORS
KENNETH R. HERMAN &
LUKAS ZIMMERMANN
BY
ATTORNEY Patented Sept. 22, 1942

2,296,669

UNITED STATES PATENT OFFICE 2,296,669

POWER TRANSMISSION

Kenneth R. Herman and Lukas Zimmermann, Detroit, Mich., assignors to Vickers Incorporated, Detroit, Mich., a corporation of Michigan Application February 23, 1940, Serial No. 320,354

7 Claims. (Cl. 103—38)

This invention relates to power transmissions, particularly to those of the type comprising two or more fluid pressure energy translating devices one of which may function as a pump and another as a fluid motor.

The invention is particularly concerned with a two-stage pumping system for use in power transmissions of this character. In power transmission systems which utilize a variable displacement pump it is frequently desirable to provide in the power circuit a fluid treating device, such as a cooler, filter, or the like. It is extremely costly to construct such devices capable of withstanding the high pressures to which they would be subjected in the high pressure side of the circuit, and it is accordingly desirable to locate such treating devices in the low pressure side of the circuit, that is, on the suction side of the pump.

Frequently, however, the fluid resistance through the device is such as to require a pressure substantially higher than atmospheric to force the desired quantity through the device, and a supercharge or booster pump becomes necessary. Where the main pump is of the variable displacement type it is necessary that the booster pump deliver the same quantity that the main pump takes in, and a variable delivery booster pump together with the necessary coordinating control mechanism is likewise expensive and cumbersome. This situation is a typical example of many situations where it is necessary to provide a booster pump for the intake of a main pump wherein it is desired to control both the volume delivered by and the pressure maintained by the booster pump.

It is an object of the present invention to provide a power transmission system of simplified construction incorporating a booster pump together with an improved driving means for the booster pump.

A further object is to provide a system of this character wherein the driving means is so connected as to automatically control the delivery rate and the pressure of the booster pump output.

Further objects and advantages of the present invention will be apparent from the following description, reference being had to the accompanying drawing wherein a preferred form of the present invention is clearly shown.

In the drawing:

Figure 1 is a diagrammatic view of a hydraulic power transmission circuit incorporating a preferred form of the present invention.

Figure 2 is a cross sectional view of a booster pump unit incorporated in the circuit of Figure 1.

Referring now to Figure 1, there is shown a prime mover generally indicated at 10 for driving a pump 12 of the variable displacement type. The pump has a swinging yoke 14 the angular setting of which determines the volumetric displacement of the pump.

The pump 12 has an intake conduit 16 and a delivery conduit 18, the latter having a branch 20 leading to a pressure compensator cylinder 22 having a spring-loaded piston 24 therein. The stem 26 of the latter is connected by a link 28 to the yoke 14. The compensator operates in the well-known manner to reduce the angle of the yoke 14 and thus reduce the displacement of pump 12 as the pressure in conduit 18 tends to increase and vice versa.

The conduit 18 extends to an accumulator 30 which is illustrated as of the air-loaded spherical type. A continuation 32 of the delivery line 18 extends to any desired fluid-utilizing work circuit indicated diagrammatically at 34. A return line 36 from the work circuit 34 extends to a suitable tank 38.

A suitable fluid treating device, such as an oil cooler 40, is located in the intake conduit 16 and is supplied with oil by a booster pump 42, the delivery conduit 44 of which connects to the intake of the cooler 40. The intake of the pump 42 is connected to tank 38 by a conduit 46. The pump 42 may be of any conventional fixed-displacement, low-pressure type, such as a gear pump.

For the purpose of driving the pump 42 a fixed displacement fluid motor 48 is provided and is connected to drive the pump 42 as indicated by the dotted line 50 in Figure 1. Motor 48 is operated by fluid from the supply line 32 which is delivered to the motor 48 through a branch conduit 52. Oil exhausting from the motor 48 is delivered to the line 44 by a conduit 54.

Preferably the booster pump 42 and its driving motor 48 are incorporated in a unitary housing as illustrated in Figure 2. Thus the unit 42 may comprise a pair of gears 56 and 58 mounted in suitable recesses in a housing portion generally designated as 60. Similarly the unit 48 may comprise a pair of gears 62 and 64 mounted in a housing portion 66. The gears 58 and 64 may be provided with internally splined driving portions which are connected by an externally splined coupling pin 68. It will be noted that the volumetric displacement per revolution of the booster pump 42 is several times that of the fluid motor 48, the ratio between their displacements being determined from the ratio desired between the pressure in supply line 32 and the pressure in line 44.

In operation, with the prime mover 10 driving the pump 12, the action of the compensator 22 together with that of the accumulator 30 serves to maintain a pressure in the delivery line 32 which is substantially constant although varying through a small range depending upon the spring characteristics of the compensator 22.

A small quantity of fluid from the supply line 32 is diverted from the work circuit 34 through branch 52, motor 48 and conduit 54. This pressure exerts a predetermined torque on the driving connection between motor 48 and pump 42. This torque in turn is converted to a predetermined hydraulic pressure in the line 44. The speed at which the booster unit turns depends entirely upon the speed and displacement setting of the pump 12, that is, upon the rate at which the pump 12 takes in oil from the conduit 16. Thus the pump 42 can turn only so fast as is necessary to deliver oil into the conduit 44 at the same rate that it is withdrawn from conduit 16 by pump 12. Thus the booster pump 42 is driven by the motor 48 to deliver oil at the same rate as the pump 12 under any possible conditions. Likewise, the pressure maintained in conduit 44 for overcoming the frictional losses of the cooler 40 is a predetermined fraction of the pressure in supply line 32. In this way a relatively inexpensive booster pump may be utilized to supply varying volumetric requirements while insuring the maintenance of sufficient boosting pressure under all conditions.

As a precautionary measure, a check valve 70 may be connected between the tank 38 and the intake conduit 16 in case of breakdown of the booster pump mechanism. This feature, however, is not necessary to the successful operation of the improved system under all non-emergency conditions.

While the form of embodiment of the invention as herein disclosed constitutes a preferred form, it is to be understood that other forms might be adopted, all coming within the scope of the claims which follow.

What is claimed is as follows:

1. In a hydraulic power transmission the combination with a main pump of the positive, variable displacement type for supplying fluid under pressure to a supply line, of supercharging means for the main pump including a fluid motor of relatively small positive displacement connected for operation from said supply line, and a supercharging pump, of large positive displacement relative to that of the motor, driven by the motor and connected to deliver fluid from a suitable source by a conduit having its sole outlet leading to the intake of said main pump.

2. In a hydraulic power transmission the combination with a main pump of the positive, variable displacement type for supplying fluid under pressure to a supply line, of auxiliary pump means of fixed displacement per revolution connected by a closed conduit to deliver the entire intake requirements of the main pump to the intake thereof, and means controlled by the pressure in the supply line for determining the delivery pressure of the auxiliary pump.

3. In a hydraulic power transmission system the combination of a main pump of the positive displacement type arranged to displace fluid at varying rates, a booster pump of fixed displacement per revolution and connected to supercharge the intake of the main pump, and means for driving the booster pump at a speed dependent on the displacement of the main pump.

4. In a hydraulic power transmission system the combination of a main pump of the positive displacement type arranged to displace fluid at varying rates, a booster pump of fixed displacement per revolution and connected to supercharge the intake of the main pump, and means for driving the booster pump with a torque dependent on the delivery pressure of the main pump.

5. In a hydraulic power transmission system the combination of two positive displacement pumps for delivering fluid to a single supply line, a prime mover for driving one pump, means for driving the other pump, a hydraulic circuit connecting said pumps including a closed conduit extending between the inlet of the one pump and the outlet of the other pump, a branch conduit from the supply line and connected with said driving means to maintain in said first conduit a pressure dependent on the pressure in the delivery line.

6. In a hydraulic power transmission system the combination of two positive displacement pumps for delivering fluid to a single supply line, a prime mover for driving one pump, means for driving the other pump, a hydraulic circuit connecting said pumps including a closed conduit extending between the inlet of the one pump and the outlet of the other pump, and means forming resistance in said conduit, said driving means being energized by fluid from the delivery line.

7. In a hydraulic power transmission the combination with a main pump for supplying fluid under pressure to a supply line, of a fluid treating device imposing greater resistance than the main pump suction can overcome and having insufficient strength to withstand delivery line pressure, conduits connecting said treating device between the main pump intake and a source of fluid, a booster pump between the source and the treating device, and means for driving the booster pump to maintain a delivery pressure at the booster pump sufficient to overcome the resistance of the treating device at all times including such times as the main pump is being started.

KENNETH R. HERMAN.
LUKAS ZIMMERMANN.